Figure 1:
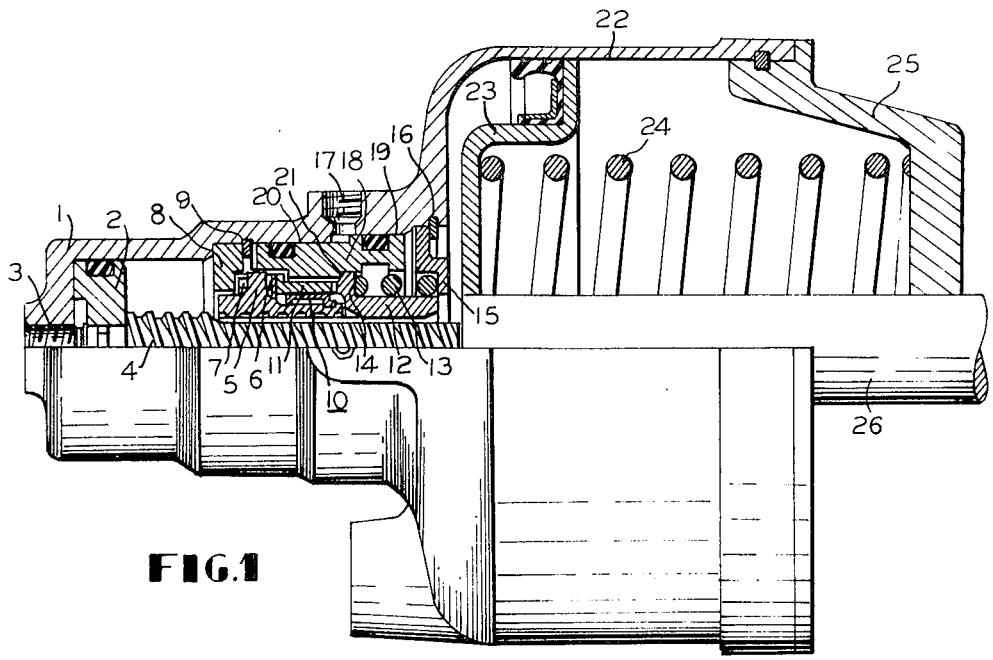

United States Patent [19]
Kraft

[11] 3,738,229
[45] June 12, 1973

[54] HYDRAULICALLY OPERATED CYLINDER-PISTON UNIT

[75] Inventor: Uno Ingemar Kraft, Malmo, Sweden

[73] Assignee: Svenska Aktiebolaget Bromsregulator, Malmo, Sweden

[22] Filed: Nov. 10, 1971

[21] Appl. No.: 197,726

[30] Foreign Application Priority Data
Nov. 27, 1970 Great Britain .................. 56,555/70

[52] U.S. Cl. .......................... 92/17, 92/24, 92/28, 188/67, 188/265
[51] Int. Cl. .......................................... F15b 15/26
[58] Field of Search .................... 92/15, 17, 18, 19, 92/20, 21, 23; 188/67, 265

[56] References Cited
UNITED STATES PATENTS

| | | | |
|---|---|---|---|
| 2,632,426 | 3/1953 | Geesink | 92/17 |
| 2,873,579 | 2/1959 | Safford | 188/265 X |
| 2,960,069 | 11/1960 | Geyer | 92/17 |
| 3,472,124 | 10/1969 | Roselius et al. | 92/17 X |

Primary Examiner—Martin P. Schwadron
Assistant Examiner—Abe Hershkovitz
Attorney—Laurence R. Brown

[57] ABSTRACT

A hydraulically-actuated cylinder-piston unit providing a forward driving force is disclosed which can be releasably locked against a return action when the hydraulic drive terminates. The release mechanism is triggered by a small force and operates independently of the force applied by the piston drive. This is accomplished by a non-locking rotating nut on the piston rod provided with a one-way clutch and a spring loaded dog clutch independent of the drive train operated hydraulically as a release trigger.

5 Claims, 3 Drawing Figures

HYDRAULICALLY OPERATED CYLINDER-PISTON UNIT

This invention relates to a hydraulically-actuated cylinder-piston unit of the kind (herein called "the kind defined") comprising a piston and a cylinder in which the piston is moved in one direction by a hydraulic force, and mechanical locking means whereby the piston can be releasably locked against movements in the opposite direction, the said mechanical locking means being releasable by hydraulic means, and said piston being provided with a screw-threaded piston rod carrying a correspondingly screw-threaded nut mounted rotatably but not making axial movements relative to the cylinder, the screw-threads of the piston rod and the nut having such pitch as to be non self-locking.

Cylinder-piston units of the kind defined may, for example, be used for applying the brakes of a vehicle. Here the mechanical locking means are used for locking the piston so as to keep the brakes applied in case the vehicle is parked for an extended period during which the hydraulic pressure in the cylinder may decrease owing to a small leakage.

A complete force transmission system of which in use the cylinder-piston unit is a part will usually include elements which suffer elastic deformations during periods of increasing the transmitted force and will return to normal as the transmitted force decreases to zero.

In order to overcome the force due to power accumulated in the elastically deformed parts of the transmission system and release the piston it has hitherto been necessary to cause the said hydraulic means to create a force of at least equal magnitude and of the opposite direction.

The present invention is intended to provide a cylinder-piston unit of the kind defined in which the mechanical locking means may be released very quickly by creating a small force which is effective independently of the magnitude of any forces due to elastic deformations in the force transmission system in which the cylinder-piston unit is included.

According to the invention there is provided a hydraulically-actuated cylinder-piston unit of the kind defined herein, characterized in that for preventing the said nut from making undesired rotations in one direction it is releasably connected to the piston rod through means comprising a one-way clutch and a spring-loaded dog clutch which can be disengaged by means of a piston.

In an advantageous arrangement the cylinder of the hydraulically-actuated cylinder-piston unit is rigid with the cylinder of a pneumatically-operable cylinder-piston unit, and the piston of the hydraulically-actuated unit is adapted to displace the piston of the pneumatically-operable unit.

The accompanying drawing shows in

FIG. 1 a cylinder-piston unit according to the invention partly in axial section, in the released condition.

Figure 2A:
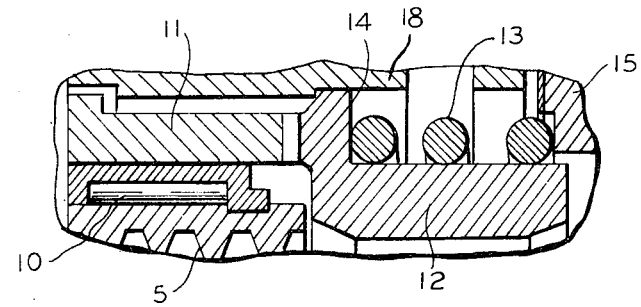
Figure 2B:
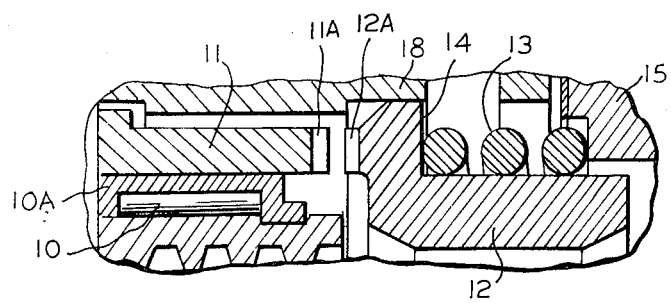

FIG. 2A shows a detail drawing of the one way clutch assembly portion of FIG. 1, and FIG. 2B shows the clutch assembly released for reverse rotation.

For convenience of description with reference to the drawing the direction from left to right is deemed to be the forward direction.

In the construction shown in the drawing a cylinder 1 is provided with a piston 2 which may be moved forwardly when hydraulic fluid under pressure is supplied through an opening 3 in an end portion of the cylinder 1. A piston rod 4 is secured to the piston 2 and is provided with screw-threads of such pitch as to establish a non self-locking connection with a nut 5 carried by the piston rod 4. The nut 5 carries a forwardly arranged axial anti-friction thrust bearing 6 and a rearwardly arranged axial anti-friction thrust bearing 7. An annular stop member 8 is mounted in the cylinder 1 and retained by a locking ring 9. The said stop member 8 determines the axial position of the nut 5 relative the cylinder 1 in the rearward direction. The nut 5 also carries a one-way clutch indicated by the reference numeral 10. The said clutch 10 of FIG. 1 is not shown in detail but is of the well-known type having a number of cylindrical needle rollers each of which is arranged in a respective somewhat wedge-shaped opening between two substantially cylindrical races of which the inner one is rigidly connected to the nut 5 while the exterior one is rigidly connected to a clutch ring 11 engaged at its rear end by the bearing 6. As shown better in FIGS. 2A and 2B, the front end of the clutch ring 11 is provided with dog clutch teeth 11A adapted to engage corresponding dog clutch teeth 12A on a coupling sleeve 12 mounted to be axially slidable on the piston rod 4. Thus the clutch 10 comprises rollers 10 and a race 10A disposed between the clutching 11 and the nut 5. A helically coiled compression spring 13 engages a forwardly-directed shoulder 14 on the coupling sleeve 12 and a rearwardly-directed surface on a spring support 15 retained in the cylinder 1 by a spring locking ring 16.

The cylinder 1 is provided with a lateral opening 17 leading to a space between the interior surface of the cylinder wall and a sleeve-shaped piston 18 having a larger diameter portion 19 and a smaller diameter portion 20. It will be understood that in case hydraulic fluid under pressure is supplied through the opening 17 the piston 18 will be moved in the forward direction. A shoulder surface 21 on the piston 18 will engage the coupling sleeve 12 and thus move the sleeve 12 forward away from the clutch ring 11 to disengage or open the dog clutch.

The cylinder 1 also comprises a larger-bore part 22 receiving a piston 23. Said piston 23 is urged rearwardly by a compression return spring 24 engaging a cylinder cover 25. The piston 23 is connected to a piston rod 26 which in turn is connected to a vehicle brake rigging not shown in the drawing.

The device described and shown in the drawing will operate as follows:

The elements of the device are shown in their positions when the brakes are released. If hydraulic fluid under pressure is fed through the opening 3 into the cylinder 1 the piston 2 and the piston rod 4 will be displaced forwardly. The nut 5 will remain in its axial position relative to the cylinder 1 but will start rotating. Such rotation of the nut 5 is possible as the one-way clutch 10 allows rotation in the relevant direction relative to the clutch ring 11, which is held against rotation by the said dog clutch teeth 11A and 12A. The piston rod 4 engages the piston 23 and drives this piston 23 forward against the action of the spring 24 until the brakes are applied.

If the pressure of the hydraulic fluid behind the piston 2 falls or is released the piston 2 remains releasably locked because the axial position of the piston rod 4 is retained due to the fact that the nut 5 is prevented from rotation because the oneway clutch 10 does not allow reverse rotation and because the clutch ring 11 is kept stationary by the engagement of the said dog clutch. If hydraulic fluid under pressure is introduced through the opening 17 the sleeve-shaped piston 18 will be displaced forwardly.

The coupling sleeve 12, as mentioned above, is axially slidable on the piston rod 4, but the coupling sleeve 12 and the piston rod 4 are provided with meshing splines and grooves comprising teeth 11A and 12A so that the coupling sleeve 12 cannot rotate relative to the piston rod 4. Thus so long as the said dog clutch remains engaged as in FIG. 2A the clutch ring 11 is also prevented from rotating relative to the piston rod 4. However, when hydraulic fluid is introduced under pressure through the opening 17 the forward movement of the piston 18 will move the coupling sleeve 12 forwardly and release the said dog clutch as shown in FIG. 2B. The nut 5 is now allowed to rotate in either direction together with the clutch ring 11, and will in fact start rotation under the action of the piston rod 4 which is pushed rearwardly by the return spring 24.

It will be noted that the release of the said dog clutch is dependent solely upon the clutch construction, i.e., the overlapping of the teeth in the clutch and the force of the spring 13. The release of the said dog clutch is thus completely independent of the forces and the elastic deformations occurring in the brake rigging prior to the brake release.

The nut 5, bearings 6 and 7, and clutch ring 11 remain in constant axial positions relative to the cylinder 1, determined by the stop member 8.

The nut 5 is prevented from making undesired rotations by being releasably connected to the piston rod 4 through means comprising the one-way clutch 10 and the spring-loaded dog clutch which is loaded by the spring 13 and can be disengaged by means of the piston 18.

The cylinder 1 is rigid with the cylinder 22 of the pneumatically-operable cylinder-piston unit 22–23, and the piston 2 is adapted to displace the piston 23 of the pneumatically-operable cylinder-piston unit.

Whilst the nut 5 is releasably connected to the piston rod 4 through the one way clutch 10 and the dog-clutch and the sleeve 12 none of the torque required to resist the rotation of the nut 5 relative to the piston rod 4 is transmitted to the cylinder 1.

The said mechanical locking means whereby the piston 4 can be releasably locked against movements in the rearward direction include the nut 5, stop member 8, clutch 10, clutch ring 11, and coupling sleeve 12; the said hydraulic means include the piston 18 whereby the mechanical locking means can be released.

I claim:

1. A drive unit for moving a piston in a forward direction and returning it in the opposite return direction, including drive force means providing a movement force in said forward direction, a force translating member coupled between said means and said piston to move said piston forward with said movement force, and means providing a return force to move said piston and said translating means in said opposite direction, including means on said translating member for releasably locking said piston in the forward direction, comprising in combination, a movable rod with screw threads of non-self locking pitch, a nut rotatable thereon, restraining means including a one way clutch coupled to permit the nut to rotate only in a direction permitting a forward movement of said translating member, a movable clutch coupled to release said restraining means to permit the nut to rotate in the direction permitting movement of said translating member in the return direction, and trigger means for moving said clutch selectively to release said restraining means and permit return of said piston by said means providing a return force.

2. A drive unit as defined in claim 1 wherein said drive force means comprises hydraulic means.

3. A drive unit as defined in claim 1 wherein said return force means comprises a spring.

4. A drive unit as defined in claim 1 wherein said movable clutch comprises a spring loaded clutch, and said trigger means comprises a hydraulic piston.

5. A drive unit as defined in claim 1 wherein the one way clutch and the movable clutch have intermeshing teeth, which are disengaged by movement of said movable clutch by said trigger means.

* * * * *